United States Patent [19]

Miller et al.

[11] 4,046,549

[45] Sept. 6, 1977

[54] RETRACTABLE SUPPORT FOR FLOAT GLASS APPARATUS

[75] Inventors: James W. Miller, Rossford; Frederick D. Zarecky, Holland, both of Ohio

[73] Assignee: Libbey-Owens-Ford Company, Toledo, Ohio

[21] Appl. No.: 688,687

[22] Filed: May 21, 1976

[51] Int. Cl.² .............................................. C03B 18/02
[52] U.S. Cl. .................................. 65/182 R; 65/99 A
[58] Field of Search ................. 65/65 A, 99 A, 182 R

[56] References Cited

U.S. PATENT DOCUMENTS

| 3,467,512 | 9/1969 | Loukes et al. ........................ 65/65 A |
| 3,649,237 | 3/1972 | Classen et al. ..................... 65/182 R |
| 3,771,985 | 11/1973 | Dickinson ........................... 65/99 A |

Primary Examiner—Arthur D. Kellogg
Attorney, Agent, or Firm—Collins, Oberlin & Darr

[57] ABSTRACT

Linear induction motors are mounted above the bath of molten metal employed in the production of a float glass ribbon to direct dross from the surface of the metal into dedrossing motors are suspended from a retracting mechanism mounted on the upper external bath structure so that they can be quickly raised from their operative position when desired, thus permitting unhindered access therebeneath to the side areas of the bath.

8 Claims, 5 Drawing Figures

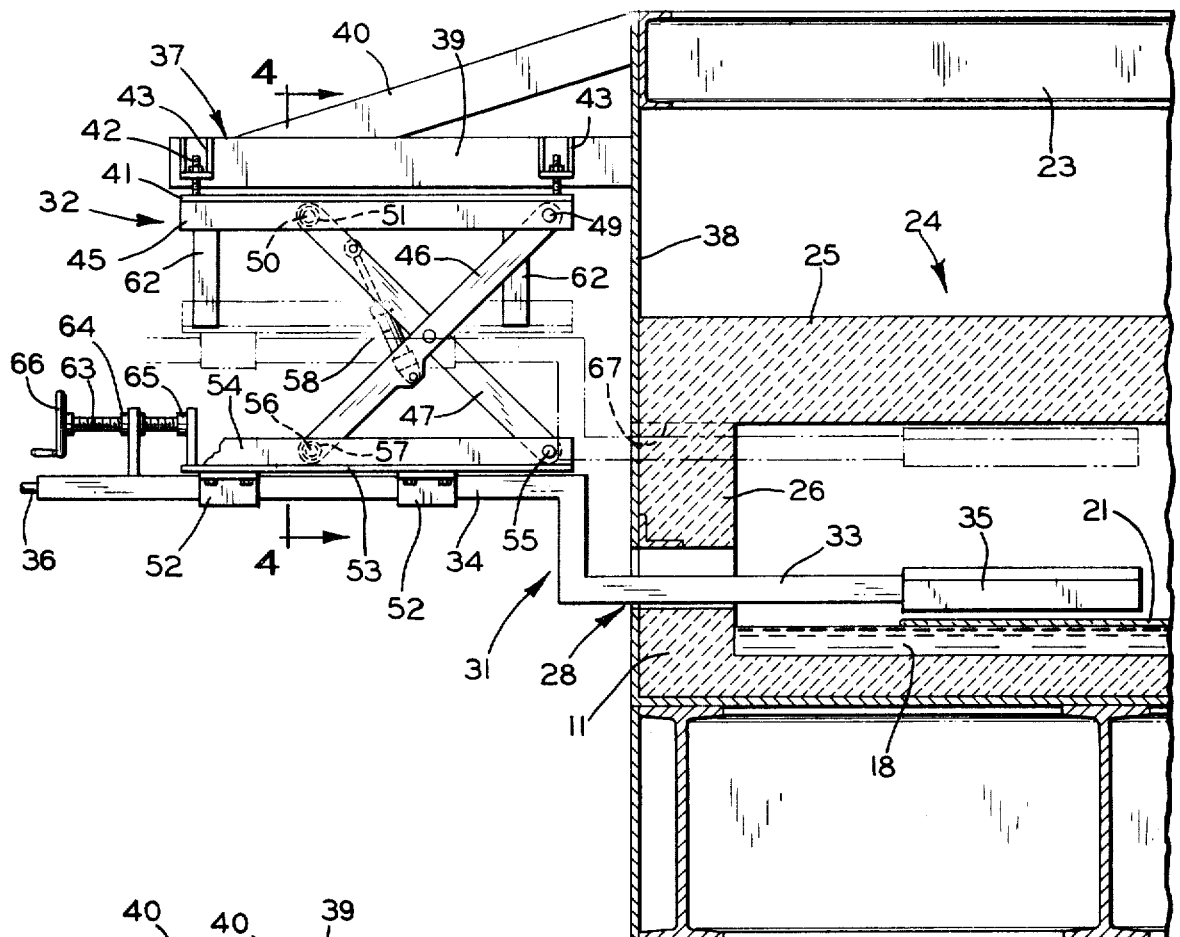
FIG. 3
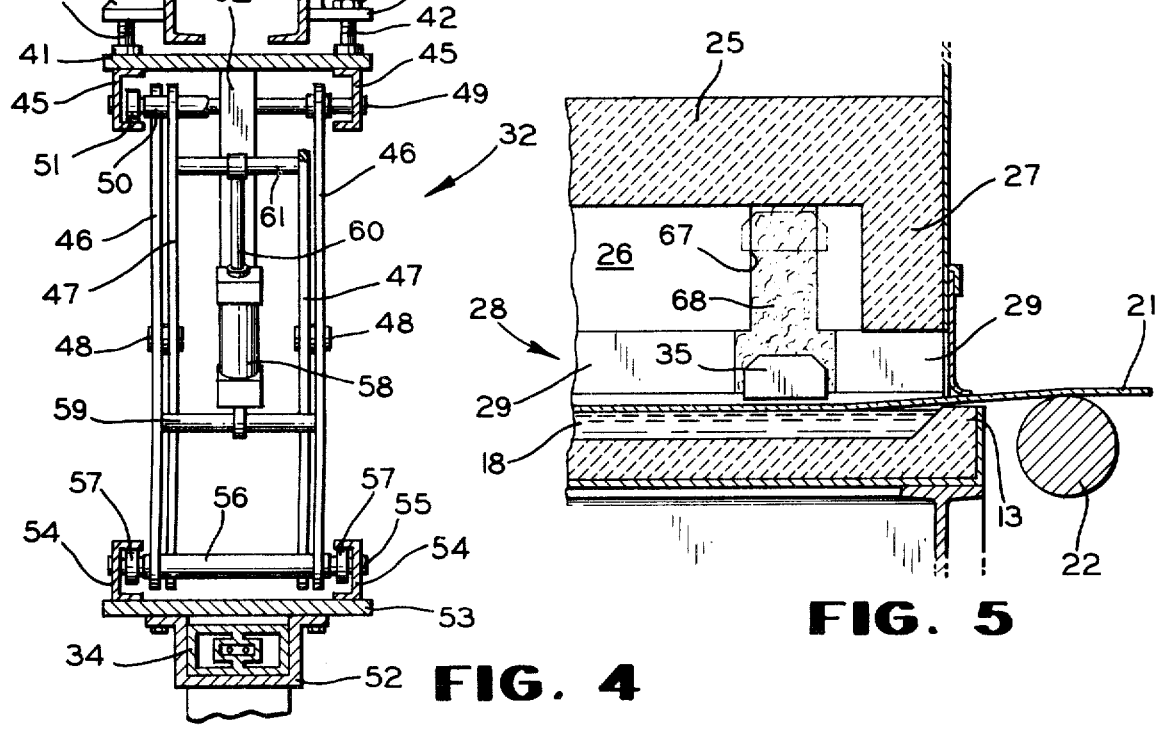
FIG. 4
FIG. 5

RETRACTABLE SUPPORT FOR FLOAT GLASS APPARATUS

BACKGROUND OF THE INVENTION

1. Field of the Invention

The present invention relates broadly to the manufacture of float glass and, more particularly, to improved means for mounting linear induction motors which extend through the side walls of float glass apparatus.

2. Description of the Prior Art

As is well known, manufacture of float glass by the float process involves delivering molten glass at a controlled rate onto a bath of molten metal which has a greater density than that of glass (such as tin or alloys of tin, for example) and advancing it along the surface of the bath under physical and thermal conditions which assure that a layer of molten glass will be established on the bath, that from the layer there will develop a buoyant body of molten glass of stable thickness, and that the buoyant body in ribbon form will be continuously advanced along the bath and sufficiently cooled as it advances to permit it to be taken from the bath by mechanical conveying means.

Above the bath of molten metal, an enclosed head space or plenum chamber is provided to contain the so-called float atmosphere. This atmosphere is generally a non-oxidizing gas (usually a mixture of gases such as nitrogen and hydrogen) maintained under sufficient pressure to prevent contamination by leakage of external atmosphere into the head space.

Various regulating or controlling devices such as coolers, heaters, water fences, edge rolls, top assistors and linear induction motors are inserted through the side walls of the bath structure to control conditions as the ribbon moves down the bath to assure that a ribbon having the proper characteristics is produced. These devices are generally supported on the floor or lower bath structure and connected to various utility service lines outside the bath structure, so that the area alongside the bath structure often becomes quite congested.

One proposal for alleviating some of this congestion is set forth in U.S. Pat. No. 3,929,444 May et al which discloses a mounting device for an edge-roll machine adapted to engage and apply forces to the margins of a glass-ribbon during its formative stage. The edge-roll machine is suspended beneath a carriage which rides on overhead rails extending longitudinally along the glass forming chamber. Provision is made for the barrel of the machine to be raised slightly so that the edge-roll is disengaged from the glass, and the entire carriage can then be moved horizontally along the rails to an out-of-the-way location so as to provide free access to the forming chamber at the edge-roll machine station.

Since considerable time is required to move or remove the regulating devices, they tend to hinder operating personnel when it becomes necessary to work on the bath under emergency conditions. This is particularly true in the case of linear induction motors mounted at the exit end of the bath structure for assisting in the collection and removal of dross from the bath of molten metal as disclosed in U.S. Pat. No. 3,467,512 to D. G. Loukes et al. The continuous glass ribbon for one reason or another occasionally breaks at the exit end where it is being removed from the metal bath. At such times it is necessary for operating personnel to quickly open up the sides of the bath structure, reestablish the ribbon and start it again moving through and out of the exit end of the bath structure. Heretofore, linear motors located in this area were a hindrance at such time and they either had to be removed, resulting in the loss of precious time, or the operating personnel had to work around them.

SUMMARY OF THE INVENTION

In accordance with the present invention, when it becomes necessary the linear motor or motors can be quickly raised vertically from their operative position to such height as to leave the area alongside the bath and within the bath beneath the motor completely unobstructed. The motors are suspended from a retracting mechanism which, in turn, is carried by the upper framework of the bath structure above the working area alongside the bath structure. A suitable opening is provided in the side wall so that the linear motor may be installed in operative position and then raised vertically by the retracting mechanism without being withdrawn from the bath. A crushable closure member is provided to seal the opening around and above the linear motor and prevent loss or contamination of the bath atmosphere during normal operation, while permitting the motor to be raised quickly in the event of an emergency. The retractable mounting mechanism is provided with a drive means which may be activated to quickly and automatically raise the linear motor without any advance preparation should the need arise, and then again lower it into operative position when desired.

It is, therefore, a primary object of the present invention to provide an improved apparatus for mounting linear induction motors which extend through the side walls of float glass bath structures.

Another object of the invention is to provide an improved apparatus for removing dross from the surface of the metal bath in a float glass producing apparatus.

Another object of the invention is to provide a retractable mounting by means of which the linear motors can be quickly raised out of operative position without manual preparation or assistance.

Still another object is to permit unhindered access from the sides to the interior of the bath structure at selected times.

Yet another object is to provide means by which linear induction motors at the exit end of a float glass bath can be quickly raised from their operative to a storage position for permitting production personnel to manipulate the glass therebeneath.

Other objects and advantages will become more apparent during the course of the following description when taken in connection with the accompanying drawings.

BRIEF DESCRIPTION OF THE DRAWINGS

In the drawings wherein like numerals designate like parts throughout the same:

FIG. 3 is a partial transverse sectional view taken substantially along line 3—3 of FIG. 1;

FIG. 4 is an enlarged vertical section taken substantially along line 4—4 of FIG. 3; and FIG. 5 is a fragmentary longitudinal vertical section taken substantially along line 5—5 of FIG. 1.

DESCRIPTION OF THE PREFERRED EMBODIMENTS

Figure 1:
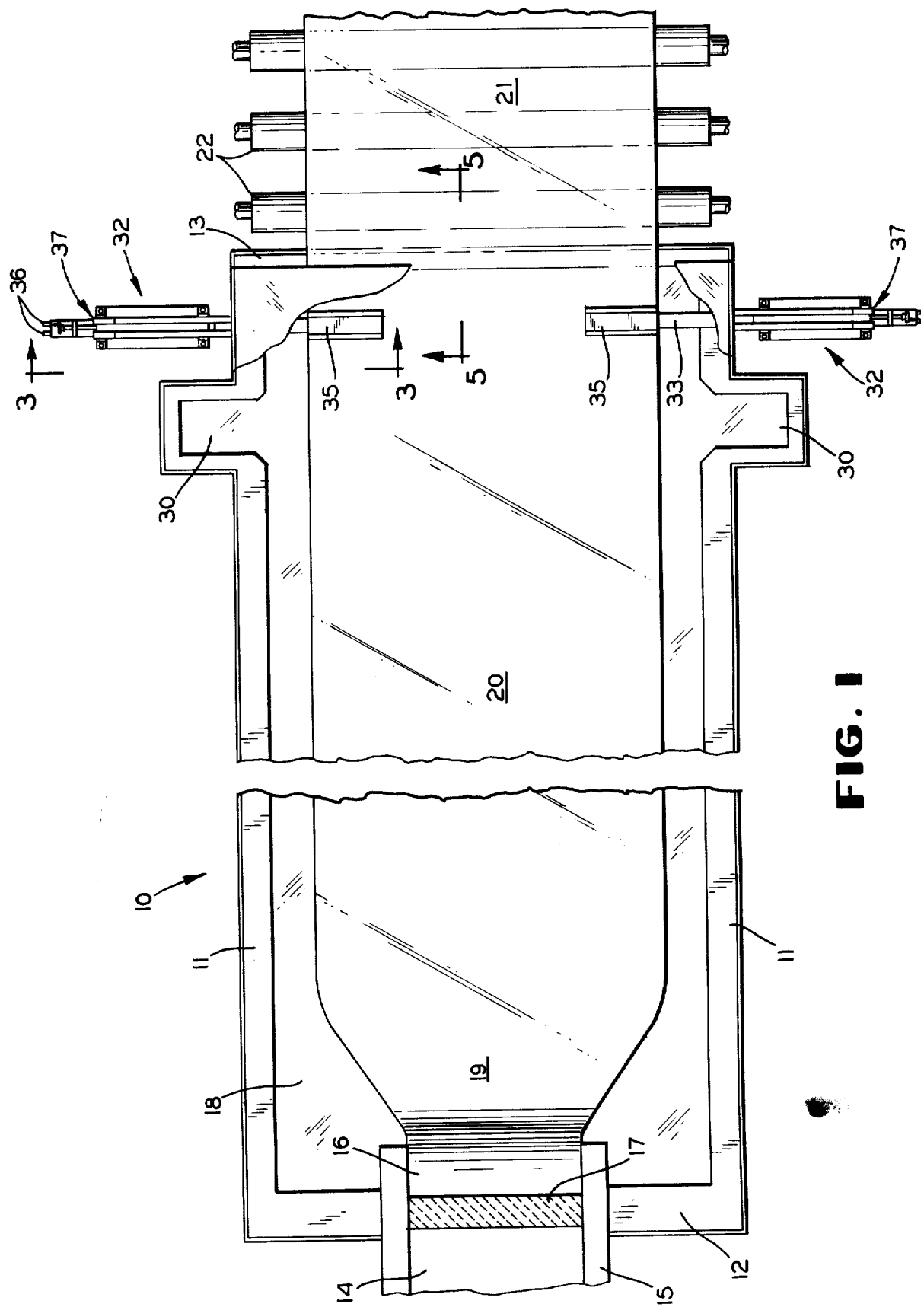
FIG. 1 is a plan view, with parts broken away, of a representative form of float glass producing apparatus embodying the invention.

Referring now to the drawings, and particularly to FIG. 1, there is shown generally an installation for producing a continuous ribbon of float glass in accordance with the invention. The installation includes an elongated tank or bath structure 10 comprising opposite side walls 11, an entrance end wall 12 and an exit end wall 13. Molten glass 14 is supplied from the forehearth 15 of a glass melting furnace through a spout 16 in an amount regulated by a tweel 17. The molten glass 14 flows from the spout 16 onto a bath of molten metal 18 (which is generally tin or an alloy of tin) contained within the tank 10 to form a layer of molten glass indicated at 19. The molten glass is allowed to flow laterally under the influence of gravity and surface tension, and is thermally regulated as it is advanced along the bath so as to develop on the surface of the bath a buoyant body of molten glass 20. The glass is then advanced in ribbon form along the bath and its temperature is gradually lowered by various thermal regulators (not shown) immersed within the molten metal bath and in the head space over the bath until it has become sufficiently set to be removed at the exit end as a ribbon 21. The ribbon is conventionally removed from the bath and conveyed into and through an adjacent annealing lehr (not shown) upon a series of aligned conveyor rolls 22.

Supported over the tank structure 10 as by a structural framework 23, is a roof structure 24 which forms an enclosed head space over the bath 18. The roof structure includes a cap 25, opposite upper side walls 26 spaced above the lower side walls 11, and upper entrance end wall (not shown), and an upper exit end wall 27. Means (not shown) is provided for supplying a protective atmosphere to the head space over the bath 18 to protect the molten metal bath against formation of contaminants thereon which might damage the glass. Means is also provided at the entrance and exit ends for substantially closing off the area around the incoming molten glass and exiting glass ribbon to minimize loss of the protective atmosphere and entrance of external atmosphere in these regions. Openings 28 between the lower side walls 11 and upper side walls 26 permit access to the interior of the tank structure during operation, and the aforementioned various regulatory devices (not shown) are also inserted through these openings. Side closure members 29 are sealed in the side or access openings 28 and around the regulatory devices during normal operation to minimize loss or contamination of the protective atmosphere.

As pointed out in the aforementioned U.S. Pat. No. 3,467,512, despite the best efforts to prevent contamination, impurities do enter the bath of molten metal from time to time and result in a fine dross on the exposed surfaces of the molten metal bath. Due to the natural convection currents in the molten metal and the movement of the glass from the hotter to the colder end, the dross migrates down along the exposed sides of the molten metal bath toward the exit end. In order to permit removal of the dross, recesses or skim pockets 30 (FIG. 1) are provided in the side walls near the exit end. The body of molten metal 18 extends into the skim pockets and the dross, due to the convection currents in the molten metal, tends to migrate into the pockets from which it may be mechanically removed as by surface skimming devices (not shown).

While the floating impurities do eventually find their way into the skim pockets 30 due to the natural surface currents, it has been proposed, as in U.S. Pat. No. 3,467,512, to employ strategically located linear induction motors for creating surface currents to accelerate the movement of the impurities down the bath of molten metal and into the skim pockets. However, as pointed out above, such linear motors in this area tend to interfere with access to the interior of the bath structure through the bath side openings 28 at critical times.

Figure 2:
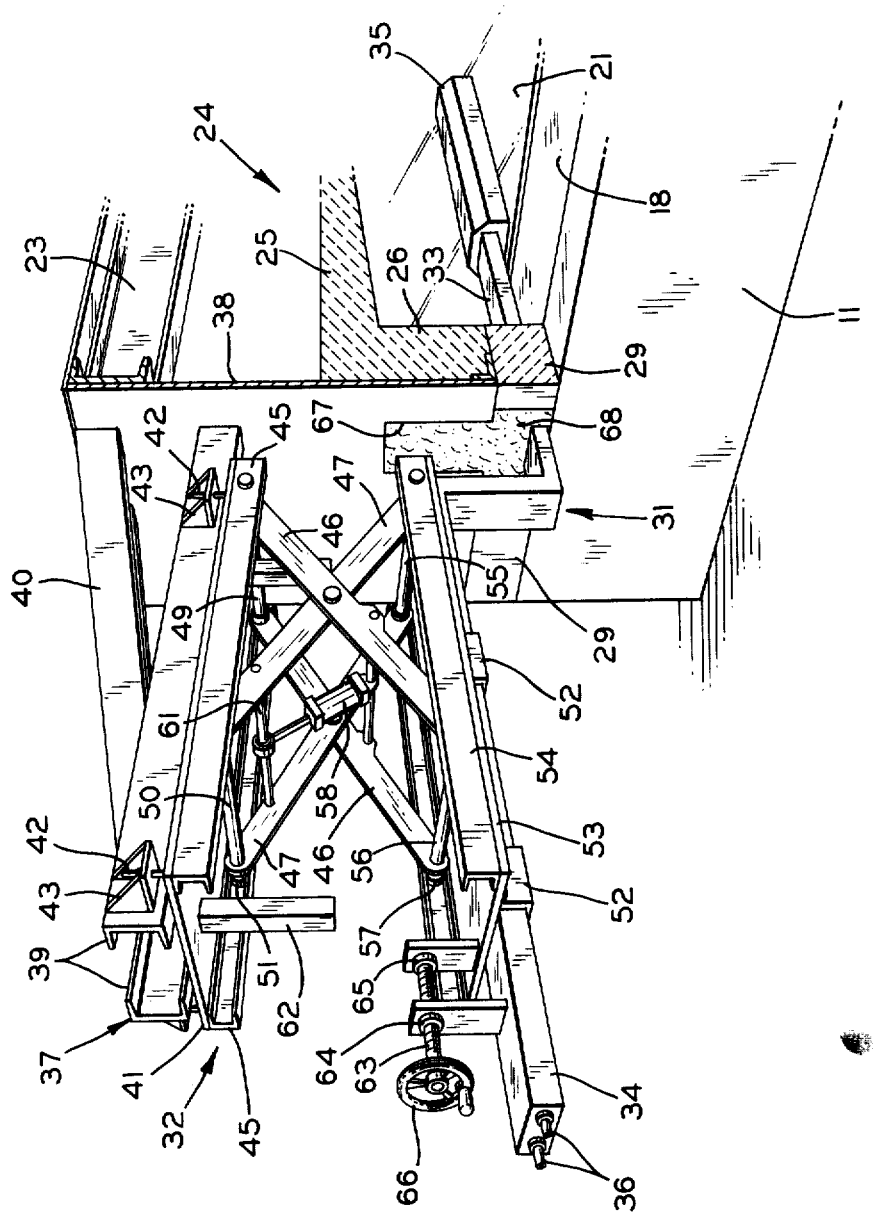
FIG. 2 is a perspective view illustrating the retractable mounting mechanism of the invention.

As best shown in FIGS. 1, 2 and 3, in accordance with the present invention linear motors 31 adjacent the exit end wall 13 at either side of the bath structure are suspended from a retractable carrier mechanism 32 whereby they can be quickly raised from the full line operating position of FIG. 3 to the storage or inoperative position shown in broken lines. The linear motor comprises an elongated beam 33, rectangular in cross section, extending through the side opening 28 into the interior of the bath structure and over the edge portion of the glass ribbon 21. Exteriorly of the bath structure, the linear motor has an offset or L-shaped beam portion 34 which provides added access height therebeneath. As illustrated in FIG. 4, the beams 33 and 34 are tubular and are interconnected at their inner ends so that a heat absorbing medium can be circulated therethrough, and electrical lead wires and mechanism for the motor also are located within the interior of the beams, all in the conventional manner. The interior construction and operation of the linear induction motors may take any conventional form, and thus this aspect of the devices is not shown in detail. In order to retard heat transfer, thereby preventing excessive cooling of the ribbon and protecting the induction mechanism against high temperatures, the portion of the beam 33 over the glass ribbon is encased in a refractory heat insulating shield 35. Supply lines 36 are connected to sources of electricity and heat absorbing medium, generally water, in the conventional manner.

In its preferred form, the retractable carrier mechanism 32 includes a frame 37 affixed to the framework 23 and casing 38 of the bath structure. The frame comprises a pair of inwardly turned channels 39 extending horizontally outwardly from the casing, and struts 40 secured thereto for rigidly supporting the outer ends of the channels. A plate 41 is carried beneath the frame 37 by bolts 42 extending through brackets 43 affixed to the channels 39. Nuts 44 on the bolts can be manipulated to level the device as necessary. Spaced parallel track channels 45 are affixed to the bottom of the plate 41. Pairs of crossed bars 46 and 47, pivotally interconnected at their point of intersection 48, are carried by the track channels 45. More particularly, the upper ends of the bars 46 are pivotably affixed to a shaft 49 extending between and fixedly carried by the track channels 45. An axle 50 extending through the upper ends of the bars 47 has rollers 51 journalled thereon adapted to ride within the track channels 45 as best shown in FIGS. 3 and 4.

The offset beam portion 34 of the linear motor 31 is slidably carried within a pair of spaced sleeves 52 affixed to a lower plate 53. A second pair of spaced track channels 54 is secured to the lower plate. The lower ends of the crossed bars 47 are pivotally affixed to a shaft 55 carried by the track channels 54, and an axle 56 extending through the lower ends of the bars 46 has rollers 57 rotatably journalled thereon to ride longitudinally within the track channels 54. Thus, it will be apparent that as the angular relationship between the cross bars 46 and 47 is changed by their pivoting about the connection 48, the rollers 51 and 57 will ride along the channels 45 and 54, respectively, causing the carrier mechanism to collapse or expand in the manner of a scissors jack and correspondingly raise or lower the linear motor 31. As illustrated in FIG. 3, the linear motor maintains its original attitude as it is raised and lowered. In other words, it does not change its angular orientation in the vertical plane in which it moves.

To this end, there is provided between the spaced pairs of bars 46 and 47 an extensible actuating device such as an air cylinder 58 which is connected to a rod 59 extending between the bars 46. The piston rod 60 of the cylinder is connected to a bar 61 extending between the bars 47. The cylinder is suitably provided with a source of operating air in the conventional manner so that it may be operated from a convenient location, either in the control room of the float glass facility or at the linear motor itself. In order to limit the height to which the motor can be raised so that the beam 33 and insulating shield 35 do not come in contact with the cap 25 of the bath structure, stop members 62 are provided on the upper plate 41 for engaging the lower plate 53 when the device is in its fully raised position.

In order to suitably longitudinally position the operative portion of the linear motor with respect to the edge of the glass ribbon 21, there is provided an adjustment screw 63. The screw extends through a threaded collar 64 affixed to the beam 34, and its end is rotatably fixed within a bushing 65 attached to the lower plate 53. Thus, by turning a wheel 66 on the adjustment screw, the beam 34 can be linearly advanced or retracted through the collars 52 to move the motor relative to the carrier mechanism 32.

An opening 67 (FIGS. 2 and 5) is provided in the upper side wall 26 to accommodate the elongated beam 33 when the linear motor is raised to its inoperative or storage position. When the motor is in its lowered, operative position this opening, as well as the side opening 28 around the beam, is filled with a lightweight crushable insulating material 68 such as a kaolin clay-base ceramic fibrous material to substantially seal off the bath atmosphere from the outside atmosphere. This material can then simply be crushed or pushed out of the way as the linear motor is raised so that raising need not be delayed while conventional refractory materials, normally used for sealing purposes, are removed.

It is to be understood that the form of the invention herewith shown and described is to be taken as a preferred embodiment of the same, and that various changes in the shape, size and arrangement of parts may be resorted to without departing from the spirit of the invention.

We claim:

1. In apparatus for producing float glass including an elongated tank containing a bath of molten metal upon which the glass is floated in ribbon form, an enclosed chamber over said tank including a roof structure spanning opposite side walls, said opposite side walls being spaced above corresponding walls of said tank to define an access opening therebetween, and regulating means extending through said access opening into said enclosed chamber, the improvement comprising a retractable carrier suspending said regulating means entirely from above whereby said regulating means can be vertically raised while retaining its original attitude from a lowered operative position along said tank to an elevated storage position permitting unhindered access therebeneath to said chamber, and means defining an opening in the side wall communicating with the corresponding access opening and extending upwardly toward said roof structure for receiving said regulating means as it is raised to said elevated storage position.

2. Apparatus for producing float glass as claimed in claim 1, including crushable means sealing said side wall opening and said access opening around said regulating means whereby said regulating means can be raised by said retractable carrier without first removing said sealing means.

3. Apparatus for producing float glass as claimed in claim 1, wherein said retractable carrier comprises a collapsible scissors jack and means collapsing and expanding said jack for raising and lowering said regulating means.

4. Apparatus for producing float glass as claimed in claim 1, wherein said regulating means comprises a linear induction motor extending inwardly over the margin of said ribbon.

5. Apparatus for producing float glass as claimed in claim 4, wherein the portion of the beam of said linear induction motor outside said enclosed chamber is offset upwardly from the portion of said beam extending into said enclosed chamber to provide additional access height beneath said beam along said tank.

6. Apparatus for producing float glass as claimed in claim 4, including means crushable by the beam of the linear induction motor sealing said side wall opening and said access opening around said beam so that said sealing means is crushed and shoved aside as said beam is raised from its operative position to said elevated storage position.

7. Apparatus for producing float glass as claimed in claim 6, in which said crushable sealing means is a lightweight insulating material.

8. Apparatus for producing float glass as claimed in claim 7, wherein said insulating material is a kaolin clay-base ceramic fibrous material.

* * * * *